Oct. 5, 1965    C. H. NORDELL    3,210,017
CLASSIFYING AND COMMINUTING APPARATUS
Filed Dec. 27, 1962    3 Sheets-Sheet 1
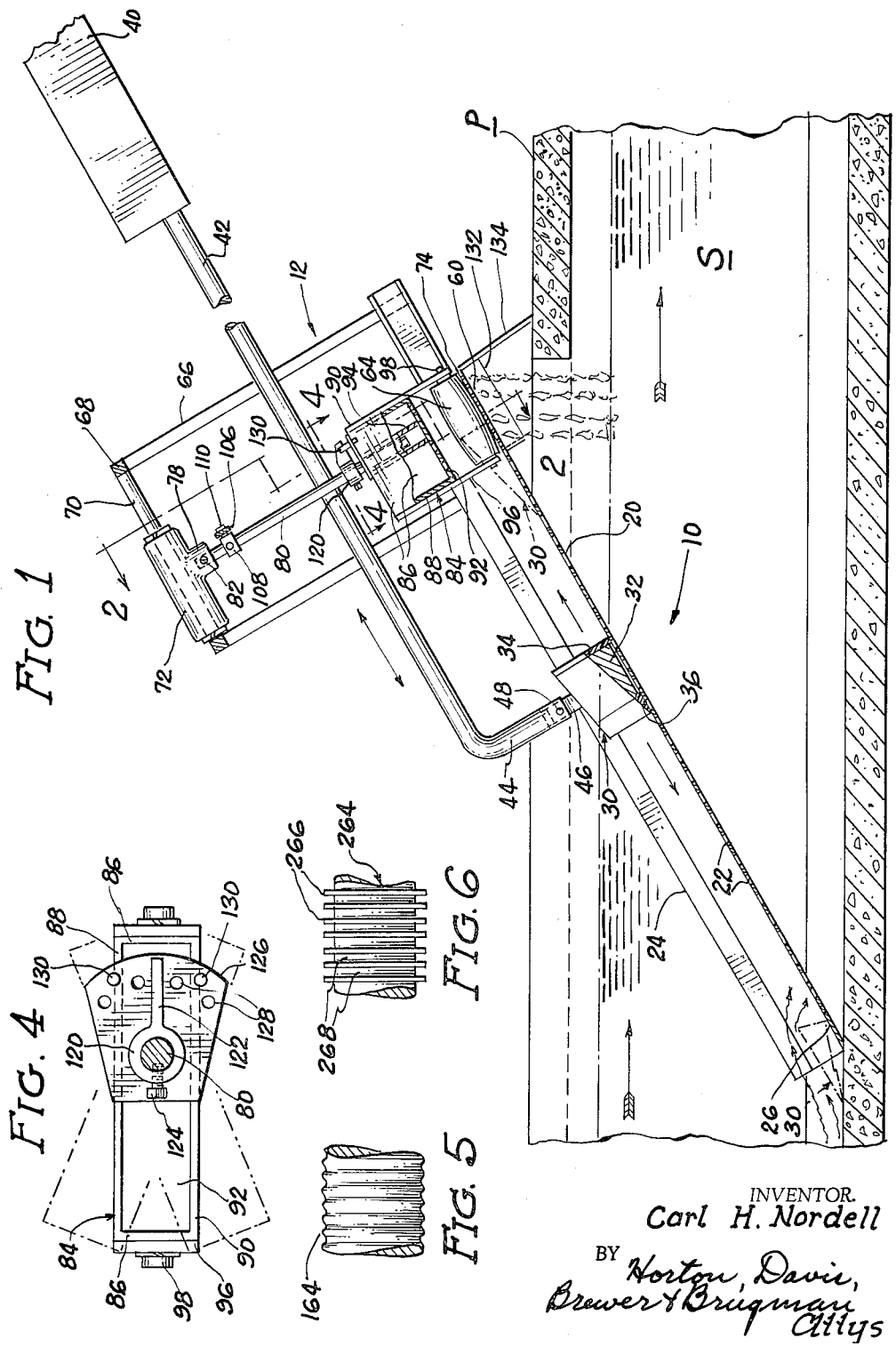
INVENTOR.
Carl H. Nordell
BY Horton, Davis,
Brewer & Brugman
Attys Oct. 5, 1965
C. H. NORDELL
3,210,017
CLASSIFYING AND COMMINUTING APPARATUS
Filed Dec. 27, 1962
3 Sheets-Sheet 2
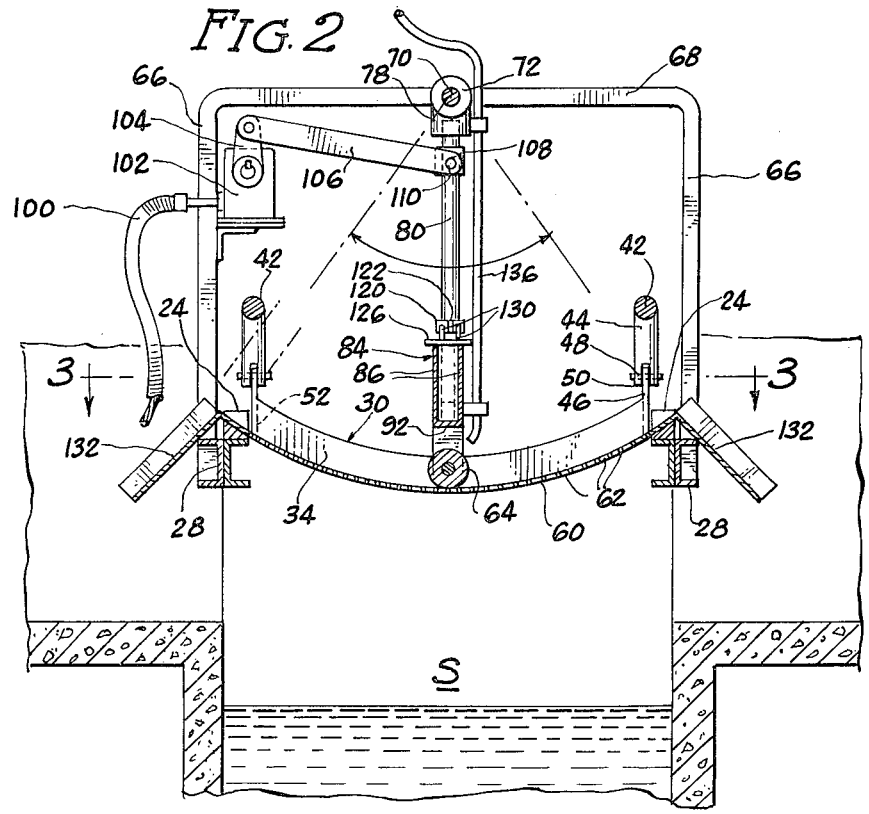
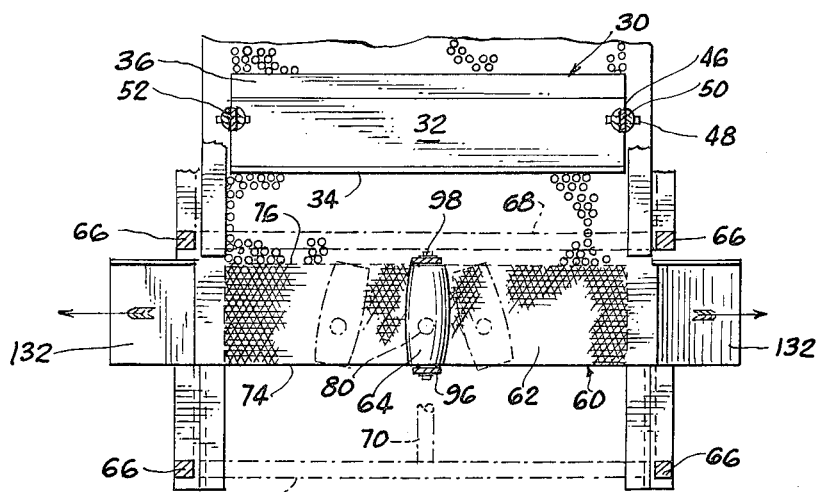
INVENTOR.
Carl H. Nordell
BY Horton, Davis,
Brewer & Brugman
Attys

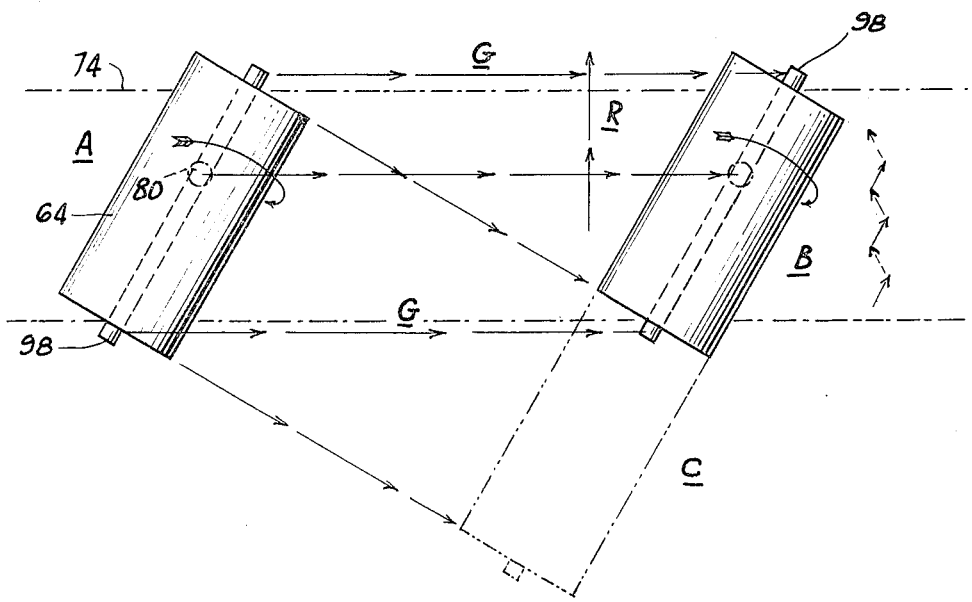

United States Patent Office 3,210,017
Patented Oct. 5, 1965

3,210,017
CLASSIFYING AND COMMINUTING APPARATUS
Carl H. Nordell, Crystal Bay, Lake Tahoe, Nev.
Filed Dec. 27, 1962, Ser. No. 247,584
18 Claims. (Cl. 241—90)

This invention relates to the art of removing solids from water or other liquid streams by screening or straining, classifying and comminuting. It will be described, for purposes of illustration, as applied to a sewage stream, although it has application in other environments such as in removing solids from a stream, river or creek, a portion of which is to be diverted to a power plant, chemical processing plant or the like for use as a cooling, washing or diluting medium.

The solids which burden sewage streams are of many diverse consistencies and sizes. They may be as small as seeds, plankton or sand, which can only be screened by the finest wire cloth having openings only a few thousandths of an inch in average transverse dimension. On the other hand, they may be trash such as leaves, paper, weeds, sticks, pieces of rubber and plastic, together with large objects of a wide variety.

Screening and comminuting devices and methods presently used, particularly in sewage treatment plants, grind up all of the solid material which is provided in the comminuting zone. That is not always the best or ideal procedure. It will be appreciated that grinding all of the solids entrained in a sewage stream causes comminuting devices to wear more rapidly than might be the case if selected obdurate portions were not ground.

Furthermore most of the obdurate material which is ground goes through the treatment plant without change. For example, rags, sticks and the like which may enter sewage streams such as through storm water inlets, even when ground, are relatively insensitive to bacteriological processes practiced in sewage treatment or digestion tanks. When ground up and allowed to pass into the digestion zones of the treatment plant, the insensitive materials merely occupy space which could be better left for that portion of the sewage solids or sludge which can be reduced in volume by digestion processes and thereby be converted into humus.

The comminuting colander and classifying method contemplated by this invention selectively comminutes and passes into the mainstream of the sewage flow very largely only that material which can be digested. That aggregate of materials, such as rags, rubber, sticks and the like, which is relatively insensitive to the commonly used digestion processes are separated from the mainstream as an adjunct of the colandering process itself, so that it may be disposed of in a more economically feasible fashion. Since most of the material separated is largely cellulosic and carbon-containing, it is apparent that it may be collected and readily incinerated, and if relatively free of putrescible matter, without odor nuisance.

The comminuting colander is adapted to be used in conjunction with a straining screen placed in the path of a sewage stream, upon which sewage solids collect and from which those solids are transferred to the comminuting colander to be selectively classified, comminuted and colandered.

It is therefore a principal object of this invention to provide, in combination, a straining screen adapted to be disposed in a stream of fluid in which solids are entrained, means whereby the solids intercepted by the screen may be cleared from the screen and transferred to a comminuting colander wherein said colander selectively classifies, comminutes and colanders predetermined portions of the solids received by it.

Yet another principal object of this invention is to provide a method for classifying sewage solids including the steps of straining sewage solids from a sewage stream, moving said sewage solids to a colandering zone, and colandering said sewage solids thereby selectively comminuting a first portion of said solids and returning said first portion to said sewage stream, and gradually removing the uncomminuted portion of said sewage solids from said colandering zone.

Another primary object of this invention is to provide a comminuting colander which is adapted to comminute certain classes of solids entrained in sewage or other similar streams while selectively classifying certain other classes of entrained solids and removing them from the colandering zone.

A more particular object of this invention is the provision of a comminuting colander which includes a colander screen traversed by a canted roller which cooperates with that screen to comminute and colander certain classes of solids and which cooperates with that screen to selectively sweep and move other classes of solids off the colander screen.

More specifically, it is an object of this invention to provide a comminuting colander adjacent one end of a straining screen, the colander being adapted to receive the solids strained from the liquid by the straining screen, the colander itself being provided with a colander screen adapted to cooperate with a cant roller which traverses its width to colander the solids and to comminute certain of the solids received from the straining screen and to selectively sweep and move other of the solids off of the colander screen.

Other objects and advantages of this invention will become apparent from the following description and drawings of which:

FIGURE 1 is a side elevational view, partially in section, of one embodiment of this invention showing both the straining and colandering zones thereof;

FIG. 2 is a rear sectional view taken substantially along the line 2—2 of FIG. 1, showing, in particular, the colandering zone;

FIG. 3 is a top sectional view taken substantially along line 3—3 of FIG. 2, showing especially the cant roller disposition;

FIG. 4 is a plan view of the roller frame taken substantially along the line 4—4 of FIG. 1;

FIG. 5 is a portion of an alternate cant roller construction that may be used with the comminuting colander of this invention;

FIG. 6 is a portion of yet another cant roller that may be used with the comminuting colander of this invention; and FIG. 7 illustrates schematically, the manner in which the cant roller operates to colander and move the strainings.

Turning now to the drawings for a more detailed description of a preferred embodiment of this invention, and first to FIG. 1, the structure includes generally a straining assembly 10 and a comminuting colander 12 to selectively comminute the strained-out material. The straining assembly may be constructed in accordance with the invention described, illustrated and claimed in my copending United States application Serial No. 131,-555, filed on August 15, 1961. That application is entitled "Screen for Removing Solids From Liquids." Since the straining assembly 10 to be described herein follows the teachings of that application, the specification and drawings of that application are here incorporated by reference.

The straining assembly 10 includes an arcuate straining screen 20 disposed at an angle to the horizontal and inclined in the direction of flow of sewage in channel S.

Straining screen 20 is curved to have an arcuate form such that transverse sections represent segments of a circle. Screen 20, as illustrated, is a sheet of metal which has been provided with a plurality of closely spaced openings 22 through which sewage solids of a predetermined size are adapted to pass.

The formed arcuate shape of the straining screen 20 is maintained by cooperating pairs of elements comprising clamping guides 24 disposed along the sides of screen 20. Each pair of elements has complementary confronting curved surfaces, the center of curvature of which is substantially the same as that of arcuate straining screen 20, between which curved surfaces the side edge regions of the screen are clamped to assist in giving the entire straining screen 20 its arcuate cross-section. The structure comprising clamping guides 24 is shown in more detail in my above-identified copending application.

The spacing between the clamping guides and the width of screen 20 itself will in large measure maintain the curvature of the screen. So also does lower anchoring clamp 26 which extends below the lower edge of the screen 20 assist in fixing the curvature of arcuate straining screen 20. The curvature at the upper edge of the arcuate straining screen, in the embodiment here illustrated, is maintained in conjunction with the colander screen with which it is integral. It is to be understood that clamping guides 24 are connected to channel members 28 (which themselves are fixed in channel S) so that they constitute, at least in part, a rigid immovable frame structure upon which straining screen 20 is supported. Lower achoring clamp 26, which constitutes an extension of screen 20, is arcuate in shape and anchored to the floor of channel S.

As shown in FIG. 1, the screen 20 is inclined in the direction of flow thereby lending support to debris and other sewage solids which will not pass through openings 22. The inclination in the direction of flow inhibits the fall of those sewage solids as they are driven upwardly along screen 20 by a wiper towards the classifying comminutor 12.

The actual clearing of screen 20 is effected by a wiper 30. Wiper 30 may be similar to that described in my U.S. Patent 2,839,197 of June 17, 1958. Wiper 30 includes a body 32 to which a plate 34, made of abrasion-resistant plastic, is fastened, and to which a scraper 36, also made of abrasion-resistant plastic, is fastened. Both plate 34 and scraper 36 are easily removed to facilitate rapid replacement as they wear out. While they are shown as being made of abrasion-resistant plastic, other suitable materials may be used depending upon local conditions and the like.

Wiper 30, especially plate 34 and scraper 36, has a convex lower surface which matches very closely the contour of arcuate straining screen 20 on its upstream side. It is to be noted that only plate 34 and scraper 36 are adapted to contact screen 20 since the lower surface of body 32 is elevated and does not normally contact screen 20. As will become apparent, plate 34 exerts a squeegee action against the upstream surface of screen 20 as it travels upwardly, thereby moving debris strained from the sewage stream by screen 20 to the uppermost region of the screen. Scraper 36 serves to scrape the surface of screen 20 as the wiper moves downwardly to the lowermost region of the screen. While it serves principally a cleaning or clearing function, its wedge-shaped leading edge assists also in directing debris scraped from the screen upwardly over wiper 30 and along the screen in the direction of flow in channel S.

As best seen in FIG. 1, wiper 30 is caused to reciprocate by reciprocator 40. Reciprocator 40 may be constructed in accordance with the description in my copending application identified above. Push rods 42 extend outwardly and downwardly from reciprocator 40 and are substantially parallel to screen 20. At the ends of push rods 42 remote from the reciprocator 40, risers 44 are connected. As illustrated, risers 44 may be angularly disposed portions of push rods 42 themselves. Each riser 44 pivotally supports a wiper mounting plate 46 on wiper pivot pins 48 between the forked ends 50 of risers 44. Wiper mounting plates 46 are connected at the sides of wiper 30, and, as seen in FIGS. 2 and 3, to assure a strong rigid connection between wiper body 32 and mounting plates 46, wiper body grooves 52 dimensioned to matingly receive end portions of mounting plates 46 are provided.

Thus as push rods 42 are reciprocated downwardly, wiper scraper 36 cleans screen 20 while the inside edge of wiper plate 34 assists in clearing the openings 22 of screen 20. When the wiper 30 reaches the bottom of the screen and lower anchoring clamp 26, the leading edge of scraper 36 contacts the channel floor (as shown in phantom in FIG. 1). At that point wiper 30 pivots somewhat upon pivot pins 48 tilting the wiper scraper 36 at an angle which assists in directing the flow of sewage and the entrained solids up and over the wiper 30 so that when wiper 30 begins its upward travel the debris will be carried upwardly along the screen. The fact that pivoting means are provided for wiper 30 also enables the wiper to slide down off the straining assembly at the lower end rather than being stopped as soon as the leading edge of scraper 36, contacts the floor of channel S, thereby facilitating clearing of the area immediately in front of lower anchoring clamp 26.

As wiper 30 moves upwardly along the arcuate straining screen 20, it wipes the surface thereof and carries debris and other sewage solids which will not pass through openings 22 upwardly along screen 20 until it reaches its upper limit. At that point in the travel, as shown in phantom in FIG. 1, wiper 30 is above the normal level of the fluid in channel S. At that point also it has entered the colandering zone assuring deposit of the debris in the comminuting colander 12.

Wiper 30, it has been said, deposits the debris and sewage solids strained out of the sewage stream by straining screen 20 in the colandering zone. In the embodiment here illustrated a colander screen 60 integral with the straining screen is provided at its upper end. Its upper edge may be fixed with countersunk screws in a transverse arcuate member (not shown). Likewise, the sides of colander screen 60 may be attached to the lower ones of the clamping guides 24 with flat head countersunk screws (not shown) so that the surface of screen 60 is relatively smooth throughout. Colander screen 60 has the same contour and shape as the straining screen 20 and is therefore readily adapted to having wiper 30 enter upon it, at least to the extent shown in phantom in FIGS. 1 and 3. Because it performs both a comminuting and a classifying function, colander screen 60 is shown as having a plurality of openings, hexagonal in shape and as closely spaced as possible to provide the largest open area as possible. Openings 22 in screen 20 need not be of the same size and shape. It is also apparent that straining screen 20 and colander screen 60 need not be integral and that they need not be of the same curvature, or shape although in the embodiment of this invention herein shown they are so described.

The colandering cycle begins after wiper 30 has been removed from the colandering zone by having been caused to begin its downward traversal of straining screen 20. To appreciate most fully the colandering cycle, the structure in addition to screen 60 comprising the comminuting colander 12 will now be described.

Colander screen 60, as has been described, has a plurality of openings 62. For ordinary work in sewage comminuting and colandering, the hexagonal openings 62 may be about ¼" and spaced as closely together as possible.

The solids which have been deposited upon screen 60 by wiper 30 lie in the path of an oscillatably mounted cant roller 64 which is supported by screen 60 and which is adapted to traverse screen 60. The structure for oscillatably supporting cant roller 64 includes upstanding columns 66 between which are disposed beams 68. The feet of columns 66 are connected to channel members 28 to form a strong connection therewith. A shown in FIG. 2, columns 66 and beams 68 are formed from unitary bar stock although it is of course possible to weld or otherwise connect suitable column and beam members to form the frame structure. Adjacent the center of each beam 68 and spanning the space between them, a pivot rod 70 is connected. It is about pivot rod 70 that cant roller 64 oscillates.

Pivot rod 70 rotatably supports a generally cylindrical sleeve 72. It also serves to locate sleeve 72 so that when cant roller 64 traverses colander screen 60, the upper and lower edges 74 and 76, respectively, of screen 60 lie between at least a portion of the ends of cant roller 64 (see FIG. 3). The locating function may be provided by providing stop pins (not shown) in pivot rod 70 or by any other suitable means. Pivot rod 70 is spaced from screen 60 a distance substantially equal to the radius of curvature of screen 60 for reasons which are apparent.

Sleeve 72 includes an enlarged housing segment 78 having a cylindrical bore of a dimension suitable to receive and to facilitate holding radius rod 80. Radius rod 80 is retained in the bore of housing 78 by a pin 82.

The lower end of radius rod 80 is disposed in roller frame 84. Roller frame 84 includes a box generally rectangular in cross-section and having side walls 86, a front wall 88, a rear wall 90, and a floor 92. It also includes a cylindrical housing 94 in which the lower end of radius rod is adapted to ride. It is to be noted that the diameter of cylindrical housing 94 is somewhat greater than that of radius rod 80 thereby permitting roller frame 84 to oscillate about radius rod 80. It is also to be noted that the floor of the cylindrical housing is well below the end of radius rod 80 (FIGS. 1 and 2) for a reason which will be described.

Front and rear walls 88 and 90 each carry a bearing plate 96 which extends below the floor 92 of the box portion of roller frame 84. It is on bearing plates 96 that cant roller 64 rotates upon suitable axles 98.

Oscillation of cant roller 64 is provided by a crank means driven from a flexible drive shaft 100 and a suitable reducing gear box 102. A driven rotating crank arm 104 extends outwardly of the gear box and a lever arm 106 is pivotally connected, at one end, thereto. At its other end lever arm 106 is pivotally connected to a collar 108 by collar pivot rod 110. Collar 108 is pinned to radius rod 80 and is therefore immovable with respect thereto. As crank arm 104 rotates, radius rod 80 moves between the extremes indicated in FIG. 2, thereby causing cant roller 64 to traverse the width of colander screen 60.

As can be seen in FIG. 1, cylindrical housing 94 is located rearwardly of the longitudinal center of roller frame 84. It can be observed in FIG. 3 as well, that the axis of radius rod 80 is thus rearward of the longitudinal center of cant roller 64. That is for a purpose.

Because roller frame 84 is oscillatably mounted on radius rod 80 and because the center of gravity of the roller frame is below the axis of radius rod 80, as the cant roller is moved from one side of screen 60 to the other, it tends to cant. Thus as seen in FIG. 3 when the cant roller moves in either direction the lower end of the cant roller tends to trail the upper end. (In looking at FIG. 3 to observe that effect one should look downwardly from the top of the figure rather than upwardly.) In FIG. 7 it may be observed that the normal tendency of the cant roller in position A would be to roll to position C. However, because axles 98 serve to restrain the free rolling of the cant roller, it moves to position B generally horizontally along guide lines G which show the paths of a point on each of the axles 98.

Thus it is seen that as the cant roller moves from position A to position B, there are both rolling and sliding components of movement. When there is material between the cant roller and the colander screen, that material which is not comminuted and pushed through the screen and which is not pushed off the sides of the screen and down chutes 132, is worked gradually upwardly in the direction indicated by arrow R along a generally zig-zag path as is illustrated in dotted line at the right of FIG. 7. It may be said, therefore, that the action of the cant roller is such that it causes material between the line of contact of roller 64 and the screen 60 upon which it is rolling, to be pushed toward the leading edge of the roller along the line of contact, along a path parallel to the axis of cant roller 64, and upwardly to the upper edge 74 of the screen. Thus it is that the material moves in a generally zig-zag path. It is the combined rolling and sliding components that assist in permitting cant roller 64 and colander screen 60 to cooperate to classify said sewage solids by comminuting selected portions of the sewage solids and return that portion to the sewage stream and to classify and remove the uncomminuted portions of the sewage solids from the colandering zone by a colander-like action.

To control the degree of cant of the cant roller as it traverses the colander screen, cant regulating means, best seen in FIG. 4, are provided. Connected to radius rod 80 just above roller frame 84 is a radius rod sleeve 120. Sleeve 120 includes a finger 122, the disposition of which with respect to radius rod 80 is fixed by set screw 124. A stop plate 126 spaced axially of radius rod 80 from finger 122 is connected to the top of roller frame 84. Stop plate 126 has a plurality of stop holes 128 disposed in complementary pairs which are adapted to receive stop pins 130. Stop pins, as seen in FIGS. 1, 2 and 4 extend upwardly from stop plate 126 and are disposed in the path of finger 122. By placing stop pins 130 is desired stop holes 128, the cant of cant roller 64 may be limited, hence regulated.

The degree of comminution and colandering obtained from roller 64 as it traverses colander screen 60 depends upon a number of factors. One is the relative amounts of the sliding and the rolling components obtained as a result of cant regulation. Another factor relates to the force exerted by roller 64 against screen 60. In the embodiment illustrated that can be varied within wide ranges by the weight of roller frame 84. Weights may be added to or removed from the box portion of roller frame 84 as desired to help control the weight of roller frame 84. Of course the material operated upon also is an important determinant.

To secure the most effective comminution and colandering, because roller 64 is canted as it traverses the arcuate strip, it should be slightly elliptical along its axis so that it is in contact throughout its length with arcuate colander screen 60. While that condition can be realized precisely for only one cant angle, if the angle is not widely changed, substantial line contact along its length will be realized. How to compensate for the colander strip contour and the roller contour so that there is substantially line contact between the roller and the strip 60 as the cant roller traverses the strip with any given predetermined cant, if such compensation is necessary, will be apparent in view of the foregoing.

As the cant roller 64 traverses the colander screen 60 it rolls over and surmounts the greater bulk of the solids which have been deposited by wiper 30. A portion, particularly the amorphous portion, is pushed through the colander screen immediately. Another portion is traversed several times. During that period it is pushed and dragged across the edges of the screen openings 62 thereby being colandered and comminuted sufficiently to enable it to pass through those openings. The solids which are not comminuted as a result of that colandering action are gradually edged up to the rear or upper edge 74 of colander screen 60 by the cooperative action of cant roller 64 and screen 60 until those rejects fall over edge 74 and along chute 134 onto platform P. Those rejects will consist mainly of twigs, rags, tramp pieces of rubber and plastic, and other similar materials, which cant roller 64 can and does surmount as it traverses colander screen 60. Large pieces of wood, sticks, bones and the like which the roller cannot surmount are pushed and moved off the side edges of the colander screen 60 by cant roller 64, hence down chutes 132.

Thus it is that the cooperative effect of the cant roller 64 and the colander screen 60 makes possible classification and comminution of the solids.

It was earlier noted that radius rod 80 did not reach all of the way to floor 92 of roller frame 84. One purpose of that is to allow roller 64 to surmount the solids as well as obstructions. Were there no "play" the colandering action and the classifying action would not be as effective, and in some instances the screen might be damaged. So also does the "play" account for and make apparent the reason for the spacing between finger 122 and stop plate 126. The space between the roller frame floor 92 and the bottom of radius rod 80 also compensates for small inconsistencies in the curvature of the screen 60 and small deviations in the centering of pivot rod 70 about which cant roller 64 oscillates.

It should perhaps be mentioned that chute 134 at the rear of screen 60 also functions to guide any large objects or solids which fall over the edge 74 of screen 60 as it is being supplied with solids by wiper 30, or in the event that solids are otherwise fed over edge 74. So also is a wash water source 136 provided to assist in maintaining screen 60 clear and clean as well as to assist in the comminuting and colandering action by lubricating in the colandering zone.

It is desirable to operate both the reciprocator 40 and the gear box 102 from the same motor, that being the reason why a flexible drive shaft 100 has been illustrated as the motive means for roller 64. In the embodiment illustrated and described herein it is necessary to synchronize the motion of cant roller 64 with that of wiper 30 since wiper 30 deposits the sewage solids on the colander screen 60 directly in the line of travel of cant roller 64. As such the roller must be out of the path of the wiper as it enters, and until it leaves, the colander screen and the colandering zone. In synchronizing the operation of the wiper and the cant roller it is desirable to have the roller traverse the colander screen from side to side a plurality of times for each cycle of the wiper.

Cant roller 64 has been shown as having a smooth surface. Where a greater comminuting and colandering effect on the solids is desired, a grooved roller 164 may be used. Roller 164 cooperates with a colander screen in the manner of a ribbed scraper in moving across the screen openings. As may be appreciated from the fragmentary portion of such a roller illustrated in FIG. 5, both a rolling and a scraping action across the openings will occur along the line of contact between the roller and the screen, thereby squeezing material through the openings in a more effective manner. It is to be understood that roller 164 also has a generally elliptical outline axially for the purpose for which roller 64 has an elliptical shape, i.e., when the colander strip is other than planar.

A roller 264 (FIG. 6) may also be used. Roller 264 includes a plurality of thin hard-steel discs 266 mounted on a central core and having spacers 268 between adjacent discs. Such a roller, also having an elliptical shape where necessary, will tend to cut up certain classes of materials, such as vegetable stems, and will cooperate with a colander screen to increase the cooperative comminuting and colandering effect of those two elements. However, since roller 264 will not cut up or comminute rags and obdurate materials, it will feed those materials outwardly along and across and off the colander screen.

Thus it is seen that both comminuting and classifying are accomplished with the invention herein described, as a result of the colander-like cooperation between cant roller 64 and colander screen 60. Adjustments in the relative amounts of comminution and classifying of the strainings received from straining screen 20 can be made by varying the angle of cant of the roller, by varying the effective weight of the roller (by adjusting the weight of the box portion of roller frame 84, by springs, or the like) and by selecting the roller having the surface most suitable for the particular comminution and colandering desired. All, of course, will depend upon the locale of the installation and the types of sewage encountered, whether they be domestic sewage or trade wastes such as cannery and slaughterhouse wastes.

While the embodiment illustrated describes arcuate screens for straining and colandering, it is apparent that the cant roller concept here disclosed and described may be used with flat colandering screens. That fact as well as the fact that other minor changes may be made in the embodiment illustrated and described without departing from the spirit of this invention will be apparent to those of ordinary skill in the art. Therefore, it is my intention to be limited only insofar as the claims appended hereto may make it necessary.

What is claimed is:

1. A colandering and classifying apparatus for solids comprising a colander screen adapted to receive solids to be colandered, roller means, means rotatably and movably mounting said roller means so that said roller means rollingly engages and cants with respect to said colander screen, driven means for moving said roller means along said screen from a first position at one edge of said colander screen to a second position at an opposite edge of said colander screen, whereby as said roller means moves along said screen from said first position to said second position, said roller means cants at a first angle with respect to said screen and as it returns along said screen to said first position it cants at a second angle with respect to said screen, said screen and said roller means cooperating, as said roller means moves along said screen, to comminute certain portions of said solids and to move and sweep certain other portions of said solids off said colander screen.

2. The apparatus of claim 1 wherein said colander screen is generally arcuate in transverse cross-section.

3. The apparatus of claim 2 wherein said roller means is in substantial line contact throughout its length with said colander screen as said roller means moves along said screen in its said first and second canted positions.

4. The apparatus of claim 3 wherein said roller means is generally elliptical in longitudinal cross-section.

5. The apparatus of claim 1 wherein the roller means has an irregular surface.

6. The apparatus of claim 5 wherein the roller means is grooved.

7. The apparatus of claim 5 wherein the roller means includes a plurality of spaced discs.

8. The apparatus of claim 1 wherein the roller means is oscillatably mounted.

9. The apparatus of claim 3 wherein the roller means is oscillatably mounted.

10. The apparatus of claim 1 wherein adjustable means for regulating the cant of said roller means is provided.

11. The apparatus of claim 1 wherein lubricating means for said roller means is provided.

12. Sewage classifying apparatus comprising a frame, a colander screen adapted to receive sewage solids supported by said frame, roller means movably mounted on said frame, means for moving said roller means along said screen from a first position at one side edge of said colander screen to a second position at the other side edge of said screen, said roller means at all times during its movement along said screen being urged against said screen, and means mounting said roller means whereby as the roller means moves from said first position to said second it cants at a first angle with respect to the screen, and as it moves from said second position to said first position it cants at a second angle with respect to said screen, said colandering screen and said roller means cooperating, as said roller means traverse said strip, to selectively comminute certain portions of said sewage solids and to sweep the remainder of said solids off of the edges of said colander screen.

13. The apparatus of claim 12 wherein the means for moving said roller means are oscillating means and wherein said roller means is generally elliptical in longitudinal cross-section.

14. In means for straining and classifying solids entrained in liquid streams, the combination comprising a straining screen interposed in a channel and adapted to intercept on its upstream surface solids entrained in the liquid flowing in said channel, a colander screen, a wiper movably mounted for clearing the solids from said straining screen and for transferring said solids to said colander screen, and movable roller means overlying said colander screen and adapted to traverse said screen alternately in a first direction and in a second direction and to be urged against said colander screen for comminuting selected portions of said solids and for selectively moving substantially all of the remainder of said solids from said colander screen, said roller means being supported by said screen and being mounted to cant at one angle with respect to said screen as the roller means traverses said screen in the first direction and to cant at a second angle with respect to said screen as the roller means traverses said screen in the second direction.

15. The means of claim 14 wherein said movable roller means are oscillatable roller means and wherein said roller means traverse said colander screen substantially at right angles to the direction in which said wiper moves.

16. The means of claim 14 wherein said straining screen and said colander screen are arcuate in transverse cross-section.

17. The means of claim 15 wherein said straining screen and said colander screen are arcuate in transverse cross-section.

18. The means of claim 14 wherein said roller means is circumferentially grooved.

References Cited by the Examiner

UNITED STATES PATENTS

| | | | |
|---|---|---|---|
| 433,777 | 8/90 | Emerson et al. | 241—81 |
| 699,762 | 5/02 | MacDonald | 241—84 |
| 1,405,846 | 2/22 | Shartle | 241—24 |
| 1,724,441 | 8/29 | Weir | 241—90 |
| 2,168,089 | 8/39 | Butler | 241—84 |
| 2,168,092 | 8/39 | Osgood | 241—84 |
| 2,199,788 | 3/40 | Durdin | 241—84 X |
| 2,877,953 | 3/59 | Heritage et al. | 241—24 |

ROBERT C. RIORDON, *Primary Examiner.*

HARRY B. THORNTON, J. SPENCER OVERHOLSER,
*Examiners.*